(12) United States Patent
Li

(10) Patent No.: US 7,520,227 B2
(45) Date of Patent: Apr. 21, 2009

(54) SEAL AND CONNECTION DEVICE BETWEEN TRAIN COMPARTMENTS

(76) Inventor: Lingqun Li, Tower A, Bldg., No. 14, Chuangye Yuan, Shuang D Gang, Gaoxinyuanqu, No. 12, Liaohedonglu, Dalian, 116620 (CN)

( * ) Notice: Subject to any disclaimer, the term of this patent is extended or adjusted under 35 U.S.C. 154(b) by 211 days.

(21) Appl. No.: 11/588,128

(22) Filed: Oct. 26, 2006

(65) Prior Publication Data

US 2007/0107622 A1    May 17, 2007

(30) Foreign Application Priority Data

Nov. 1, 2005    (CN) .................... 2005 1 0117176

(51) Int. Cl.
*B60D 5/00*    (2006.01)
(52) U.S. Cl. .......................... 105/15; 105/8.1
(58) Field of Classification Search ................ 105/8.1, 105/15; 280/400, 401, 403
See application file for complete search history.

(56) References Cited

U.S. PATENT DOCUMENTS

| | | | | |
|---|---|---|---|---|
| 2,991,509 A | * | 7/1961 | Brophy, Jr. ................. | 264/339 |
| 3,387,568 A | * | 6/1968 | Hawes ......................... | 105/15 |
| 3,486,464 A | * | 12/1969 | Dean et al. .................. | 105/10 |
| 4,318,345 A | * | 3/1982 | Kleim ......................... | 105/15 |
| 4,539,912 A | * | 9/1985 | Hassel et al. ............... | 105/8.1 |
| 4,599,947 A | * | 7/1986 | Keefer ........................ | 105/15 |
| 4,858,535 A | * | 8/1989 | Bechu et al. ............... | 105/15 |
| 4,905,607 A | * | 3/1990 | Wanneroy .................. | 105/8.1 |
| 5,562,042 A | * | 10/1996 | Luck et al. ................. | 105/8.1 |
| 5,823,117 A | * | 10/1998 | Ommerli .................... | 105/8.1 |
| 6,076,470 A | * | 6/2000 | Koch ........................... | 105/8.1 |
| 6,435,101 B1 | * | 8/2002 | Marker et al. ............... | 105/15 |
| 6,926,344 B2 | * | 8/2005 | Koch et al. .................. | 296/178 |
| 2002/0129733 A1 | * | 9/2002 | Kennedy .................... | 105/8.1 |
| 2005/0183622 A1 | * | 8/2005 | Petit et al. .................. | 105/8.1 |
| 2007/0107622 A1 | * | 5/2007 | Li ............................... | 105/15 |
| 2007/0131135 A1 | * | 6/2007 | Moser et al. ............... | 105/8.1 |

OTHER PUBLICATIONS

ZhiKai Zhou, Vestibule Diaphrams on High Speed Cars, 1998. The Railway Vehicle (China), vol. 3. p. 4-9.

* cited by examiner

*Primary Examiner*—S. Joseph Morano
*Assistant Examiner*—Jason C Smith
(74) *Attorney, Agent, or Firm*—Law Offices of Albert Wai-Kit Chan, PLLC

(57) ABSTRACT

The present invention discloses a seal and connection device between train compartments comprised of a Π shaped rubber groove having two groove walls and a groove bottom. A width between the two groove walls is substantially equal to that of a slit between two neighboring compartments. The two groove walls can be fixed to ends of the two neighboring compartments respectively and the groove bottom are extended toward two ends thereof to form groove brims so that the groove brims can abut against end side walls of the compartments tightly. A slit between the compartments at the inner side of the train during swerving is narrowed a and a slit between the groove wall and the arc-shaped corners of the compartment is decreased, and the groove brims shift position with respect to the end side walls of the compartment inwardly; and a slit between the compartments at the outer side of the train during swerving is enlarged and a slit between the groove wall and the arc-shaped corners of the compartment is increased, and the groove brims shift position with respect to the end side walls of the compartment outwardly. With the above construction, a smooth hermetic connection between the compartments is achieved.

13 Claims, 3 Drawing Sheets

SEAL AND CONNECTION DEVICE BETWEEN TRAIN COMPARTMENTS

This application claims priority of Chinese Application No. 200510117176.6, Filed Nov. 1, 2005, the entire disclosure of which is incorporated by reference herein in its entirety.

BACKGROUND OF THE INVENTION

1. Field of the Invention

The present invention relates to the technical field of rail train, more particularly, to a seal and connection device between train compartments for a magnetic suspension train or railway train.

2. Description of the Related Art

Compartments of the existing railway passenger car are non-sealedly connected by rubber cylinders or bellow type collapsible devices. These technologies in the prior art do not have good sealing effects to ensure that a negative air pressure is not formed in the compartments. Further, the surface is rough, thus increasing the resistance exerted on the train during running of the train.

Further, in a TR08 type magnetic suspension train in Shanghai imported from Germany, Rubber slits more than 20 mm are provided at outer end connecting positions of the compartments. This known technology does not have sealing function either, and it also has the technical problem of large resistance during running of the train.

SUMMARY OF THE INVENTION

The object of the invention is to provide a seal and connection device between train compartments, which not only ensures the elasticity of the train required for swerving and climbing slopes, but also ensures the hermetic connection between two compartments for the stability of air pressure in the compartments. Furthermore, the device can also ensure the smooth transition at the connection positions of the trains to decrease the resistance during running of the train.

To achieve the above mentioned object of the present invention, the present invention provides a seal and connection device between train compartments, comprised of a Π shaped rubber groove body having two groove walls and a groove bottom, a width between the two groove walls being equal to that of a slit between two neighboring compartments, the two groove walls can be fixed to ends of the two neighboring compartments respectively, the groove bottom are extended toward two ends thereof to form groove brims so that the groove brims can abut against end side walls of the compartments tightly;

wherein a he slit between the compartments at an inner side of the train during swerving is narrowed and a slit between the groove wall and the arc-shaped corner of the compartment is decreased, and the groove brims shift position inwardly with respect to the end side walls of the compartment; and a slit between the compartments at the outer side of the train during swerving is enlarged and a slit between the groove wall and the arc-shaped corners of the compartment is increased, and the groove brims shift position outwardly with respect to the end side walls of the compartment, thus a smooth hermetic connection between the compartments is formed.

Preferably, the groove bottom is connected with the groove walls with a arc shaped portion to strengthen the connection of the groove walls with the groove bottom.

Preferably, the groove walls and the groove bottom are integrally formed.

Preferably, an outer metal plate is fixed at an outer side of the groove bottom.

Preferably, the outer metal plate is extended toward two ends thereof to form groove brims so that the groove brims can abut against side walls at the ends of the compartments.

Preferably, an inner metal plate is fixed at an inner side of the groove bottom.

Preferably, the groove bottom is sandwiched between the outer metal plate and the inner metal plate to form a composite groove bottom.

Preferably, the inner and outer metal plates are fixed by screws or rivets.

Preferably, the groove brims are extended with two ends thereof being gradually attenuated to be formed into a wedge shape.

According to another aspect of the present invention, a seal and connection device between compartments is provided, the device is comprised of a Π shaped rubber groove body having two groove walls and a groove bottom, the width of the rubber groove is equal to that of a slit between two neighboring compartments, the groove bottom and the groove walls being integrally formed, an outer metal plate and an inner metal plate are respectively formed at inner and outer sides of the groove bottom to form a composite structure, the two groove walls are fixed to the ends of the two neighboring compartments, the groove bottom or the outer metal plate is extended toward two ends thereof to form groove brims so that the groove brims can abut against end side walls of the compartments tightly.

wherein a slit between the compartments at the inner side of the train is narrowed during swerving, a slit between the groove wall and the arc-shaped corners of compartment is decreased, and the groove brims shift position inwardly with respect to the end side walls of the compartment; and a slit between the compartments at the outer side of the train during swerving is enlarged, a slit between the groove wall and the arc-shaped corners of the compartments is increased, and the groove brims shift position outwardly with respect to the end side walls of the compartment, thus a smooth hermetic connection between the compartments is formed.

BRIEF DESCRIPTION OF THE DRAWINGS

The above and other objects, and features, and advantages of the preferred embodiments of the invention will be more apparent from the following description taken in conjunction with the accompanying drawings, in which.

DETAILED DESCRIPTION OF THE PREFERRED EMBODIMENT

Figure 1:
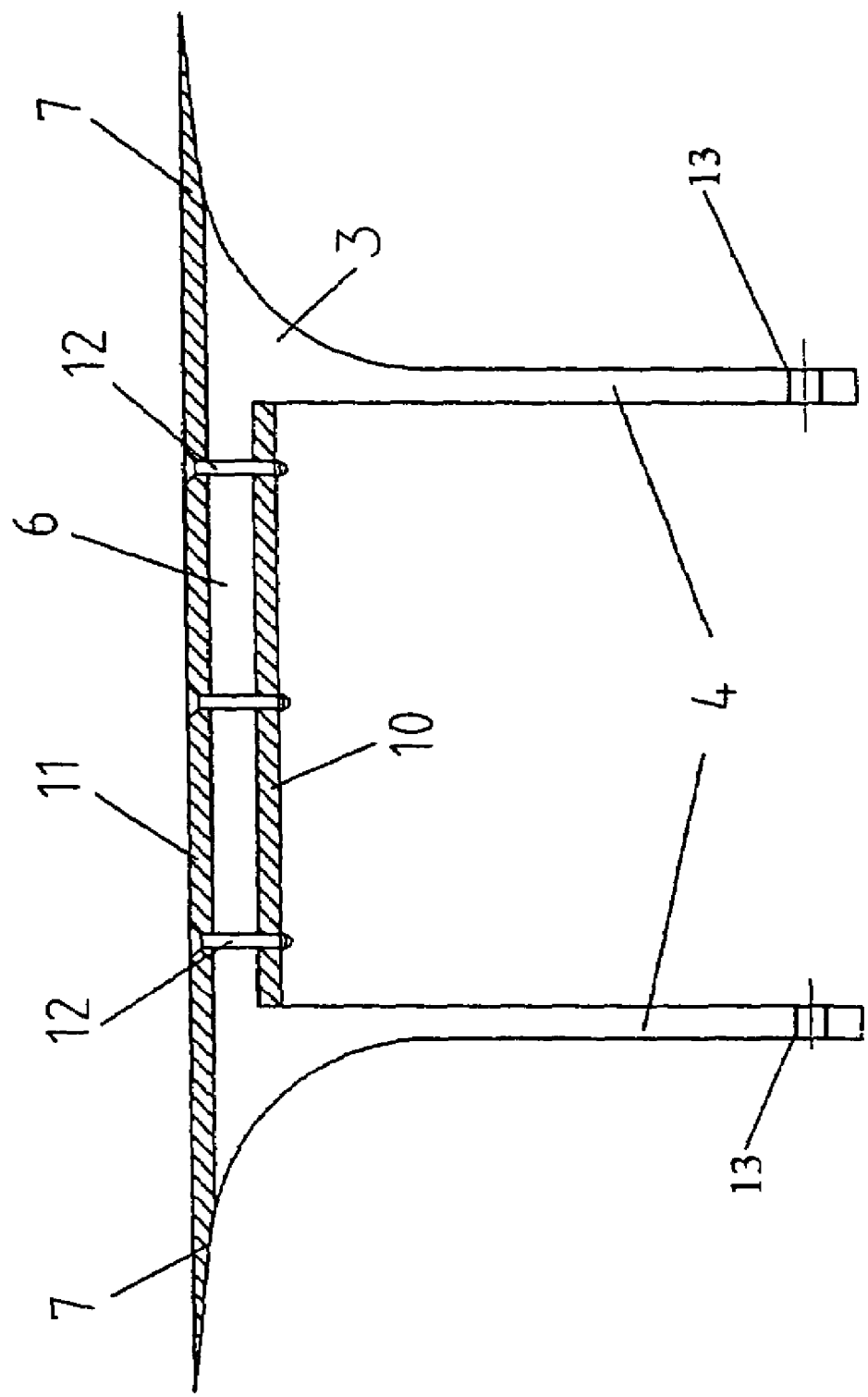
FIG. 1 is a schematic cross-sectional view of a groove-shaped seal and connection device according to the present invention.

Reference will now be made in detail to the present preferred embodiments of the present invention, examples of which are illustrated in the accompanying drawings, wherein like reference numerals refer to like elements throughout the specification. The embodiments are described below in order to explain the present invention by referring to the figures rather than limit the scope of the invention.

Referring to FIG. 1, the seal and connection device of the present invention is comprised of a Π shaped annular rubber groove body that is formed by rubber which preferably has excellent elasticity and strong retractility. FIG. 1 is a cross sectional view of the Π shaped rubber groove body. As shown in FIG. 1, the Π shaped rubber groove body comprises two groove walls 4 and a groove bottom 6 to form a Π shape. However, the groove walls 4 and groove bottom 6 can be formed separately. Preferably, as shown in FIG. 1, the groove walls 4 and groove bottom 6 are integrally formed.

A width between the two groove walls 4 is equal to that of a slit between two neighboring compartments. The groove bottom 6 is connected with the groove walls 4 by arc-shaped edges 3 to strengthen the connection of the groove bottom 6 with the groove walls 4. Preferably, an outer metal plate 11 is fixed to an outer side of the groove bottom 6 to strengthen the strength of the rubber groove. It is further preferable that an inner metal plate 10 is fixed at the inner side of the groove bottom 6. As shown in FIG. 1, the inner metal plate 10 is fixed across the inner side between the groove walls 4. In this case, the groove bottom 6 is fixed between the outer metal plate 11 and inner metal plate 10 to form a structure with composite groove bottom, so that the strength of the rubber groove is further increased. The two metal plates 11 and 10 can be fixed with fastening means, such as screws or rivets 12.

In order that the extending ends at two sides of the rubber groove abut against the walls of the neighboring compartments 1 and 2, the groove bottom 6 and/or the outer metal plate 11 extends to form groove brims. Preferably, the groove bottom 6 and/or the outer metal plate 11 extends towards the two ends thereof which are gradually attenuated to form a wedge shaped brims 7. The brims 7 forms smooth hermetic connection with the compartment walls.

Figure 2:
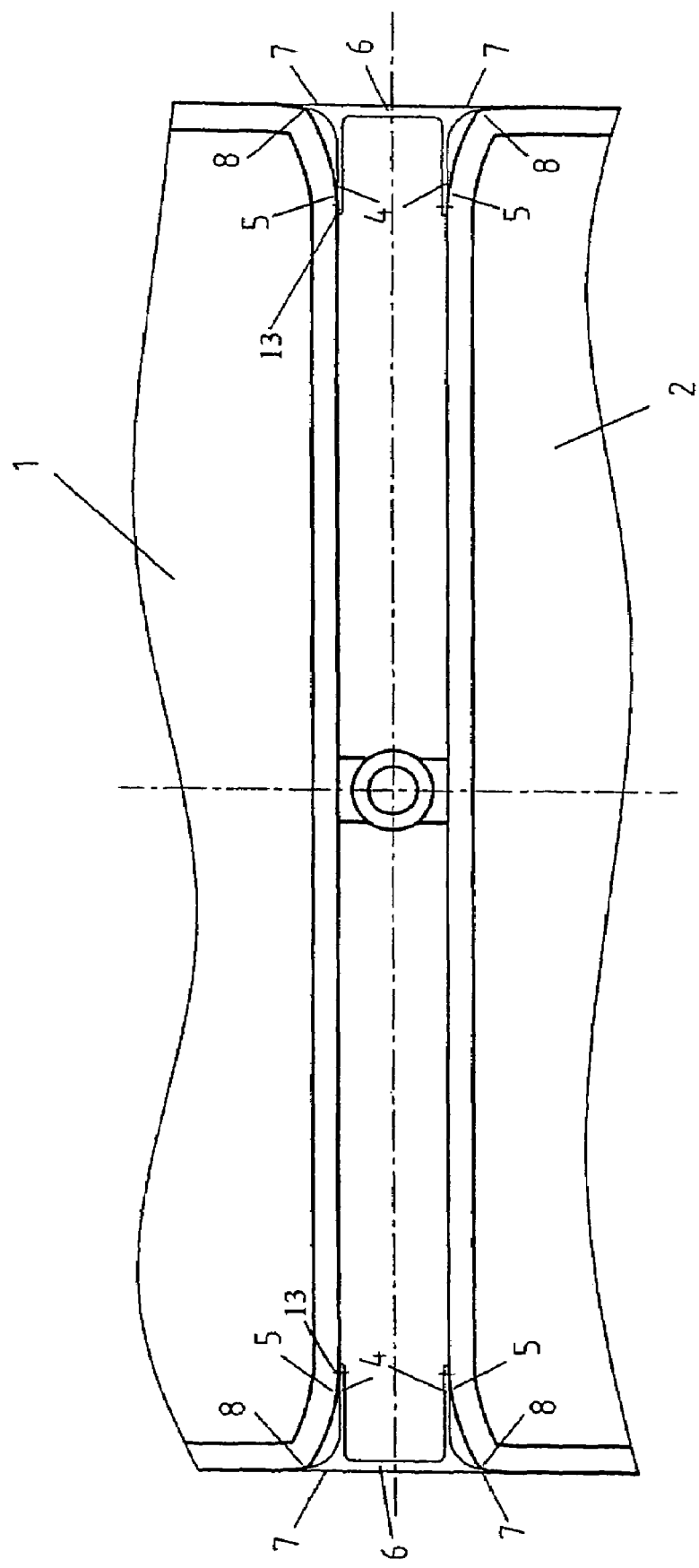
FIG. 2 is a schematic plan view showing a groove shaped seal and connection device according to the present invention applied to a train running in a straight way.
Figure 3:
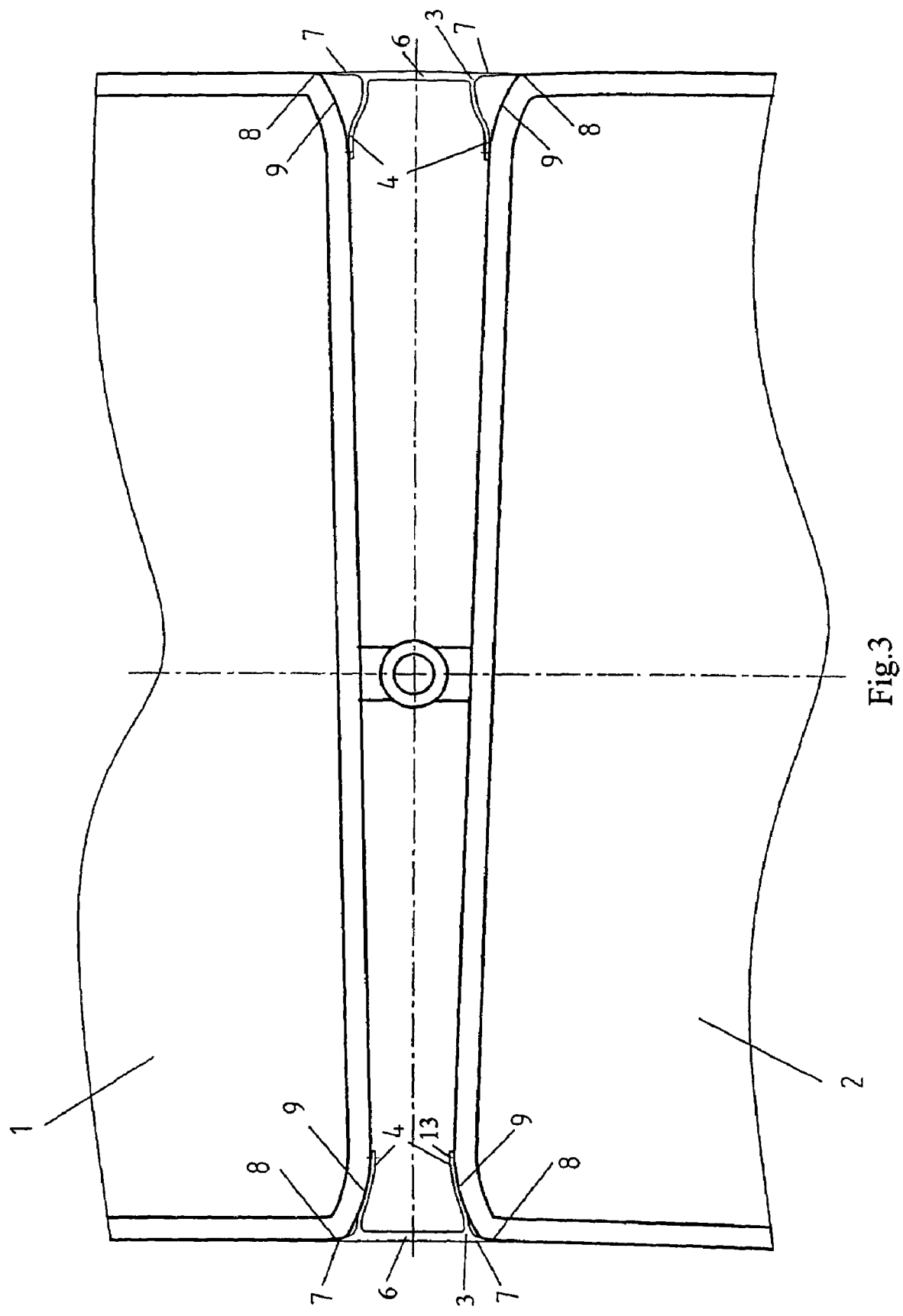
FIG. 3 is a schematic plan view showing a groove shaped seal and connection device according to the present invention applied to a train during swerving.

Referring FIGS. 2 and 3, the operation principle of the seal and connection device of the present invention lies in that the groove walls 4 are bonded to the end walls 5 of the two neighboring compartments 1 and 2. To further ensure the connecting strength of the groove walls 4 with the end walls 5, preferably screw holes 13 are provided on the groove walls 4, then the groove walls 4 are further screwed tightly with the end walls 5 of the compartments by a plurality of screws penetrating through the screw holes 13. The groove bottom 6 and the wedge-shaped brims 7 extending towards two ends thereof are tensioned inwardly by the groove walls 4 and abut against the arc-shaped end parts of the compartments to provide inner sealing while maintaining smooth appearance. When the train is running in a straight line, the surrounding groove walls 4 are parallel to each other and are vertical to the groove bottom 6.

When the train is swerving, a slit between the compartments at the inner side of the train (as shown the left side in FIG. 3) is narrowed and the slit between the groove wall 4 and the arc shaped corner 9 of the compartment is decreased. As a result, the wedge-shaped brims 7 at the inner side of the train shift position with respect to the end side walls 8 of the compartment inwardly. As shown in FIG. 3, the wedge-shaped brims 7 at the inner side of the train shifts in a direction along which they come close to each other. Meanwhile, a slit between the compartments at the outer side of the train (as shown the left side in FIG. 3) is widened and the slit between the groove wall 4 and the circular arc shaped corner 9 of the compartment is enlarged. As shown in FIG. 3, the wedge-shaped brims 7 at the outside of the train shifts in another direction along which they go away from each other.

However, since composite groove bottom 6 made of rubber and metal plates is straightly pressed on the arc-shaped end side wall 8 of the compartments with a pressing force generated by the stretching deformation of the groove walls 4, the wedge-shaped brims 7 shift position with respect to the end side walls 8 outwardly at this time while maintaining sealing between the groove body and the train compartment. During the running of the train, both the inner and outer sides of the train are smoothly and hermetically sealed. Since the groove body of present invention is used to surround the whole train, similar technical effect is achieved during left-turning, right-turning, climbing slopes and descending slopes etc.

The present invention embodied in a train has the following advantages:

1. Hermetically sealed connections are ensured whether the train is swerving or climbing/descending slopes;
2. The compartments are smoothly connected with favorable aesthetical appearance and low resistance.
3. The cost is low; and
4. The seal and connection device is durable.

Although a preferred embodiment has been shown and described, it would be appreciated by those skilled in the art that changes may be made in these embodiments without departing from the principles and spirit of the invention, the scope of which is defined in the claims and their equivalents.

The invention claimed is:

1. A seal and connection device between a first train compartment and a second train compartment, comprising a groove bottom and two groove walls, wherein the two groove walls (i) are each perpendicular to the groove bottom, (ii) are separated by a width being substantially equal to that of a slit between the two train compartments, (iii) are each parallel to the transverse ends of the train compartments, and (iv) can each be fixed to separate transverse ends of the two train compartments, wherein the groove bottom extends longitudinally and forms a brim at each of the two ends of the groove bottom so that one brim can abut tightly against a lateral side wall of the first train compartment, and another brim can abut tightly against a lateral side wall of the second train compartment, wherein the slit between the two train compartments is narrowed at a first side of the train during swerving and the brims shift position inwardly with respect to the lateral side walls of the train compartments at said first side, wherein the slit between the two train compartments is enlarged at a second side of the train during swerving and the brims shift position outwardly with respect to the lateral side walls of the train compartments at said second side, thereby forming a smooth hermetic connection between the two neighboring train compartments.

2. The device of claim 1, wherein the groove bottom is connected with the groove walls with an arc shape portion so as to strengthen the connection of the groove walls with the groove bottom.

3. The device of claim 1, wherein the groove walls and the groove bottom are integrally formed.

4. The device of claim 1, wherein the groove bottom is sandwiched between an outer metal plate and an inner metal plate to form a composite groove bottom.

5. The device of claim 4, wherein the outer metal plate is extended toward two ends of the groove bottom to form brims at the ends of the groove bottom so that the brims can each abut against a lateral side wall of a train compartment.

6. The device of claim 4, wherein the outer and inner metal plates are fixed to the groove bottom by screws or rivets.

7. The device of claim 1, wherein screw holes are formed on the groove walls, and a plurality of screws penetrating through the screw holes connect the groove walls to the separate transverse ends of the two train compartments.

8. The device of claim 1, wherein the brims are wedge-shaped.

9. A seal and connection device between a first train compartment and a second train compartment, comprising a groove bottom and two groove walls, wherein the two groove walls (i) are each perpendicular to the groove bottom, (ii) are separated by a width being substantially equal to that of a slit between the two train compartments, (iii) are each parallel to the transverse ends of the train compartments, and (iv) can each be fixed to separate transverse ends of the two train compartments, wherein the groove bottom and the groove walls are integrally formed, the groove bottom is sandwiched between an outer metal plate and an inner metal plate, and the outer metal plate extends longitudinally and forms a brim at each of the two ends of the groove bottom so that one brim can abut tightly against a lateral side wall of the first train compartment, and another brim can abut tightly against a lateral side wall of the second train compartment, wherein the slit between the two train compartments is narrowed at a first side of the train during swerving and the brims shift position inwardly with respect to the lateral side walls of the train compartments at said first side, wherein the slit between the two train compartments is enlarged at a second side of the train during swerving and the brims shift position outwardly with respect to the lateral side walls of the train compartments at said second side, thereby forming a smooth hermetic connection between the two neighboring train compartments.

10. The device of claim 9, wherein the brims are wedge-shaped.

11. The device of claim 9, wherein the inner and outer metal plates are fixed to the groove bottom by screws or rivets.

12. The device of claim 9, wherein the groove bottom is connected with the groove walls with an arc shape portion so as to strengthen the connection of the groove walls with the groove bottom.

13. The device of claim 9, wherein screw holes are formed on the groove walls, and a plurality of screws penetrating through the screw holes connect the groove walls to the separate transverse ends of the two train compartments.

* * * * *